Patented May 24, 1927.

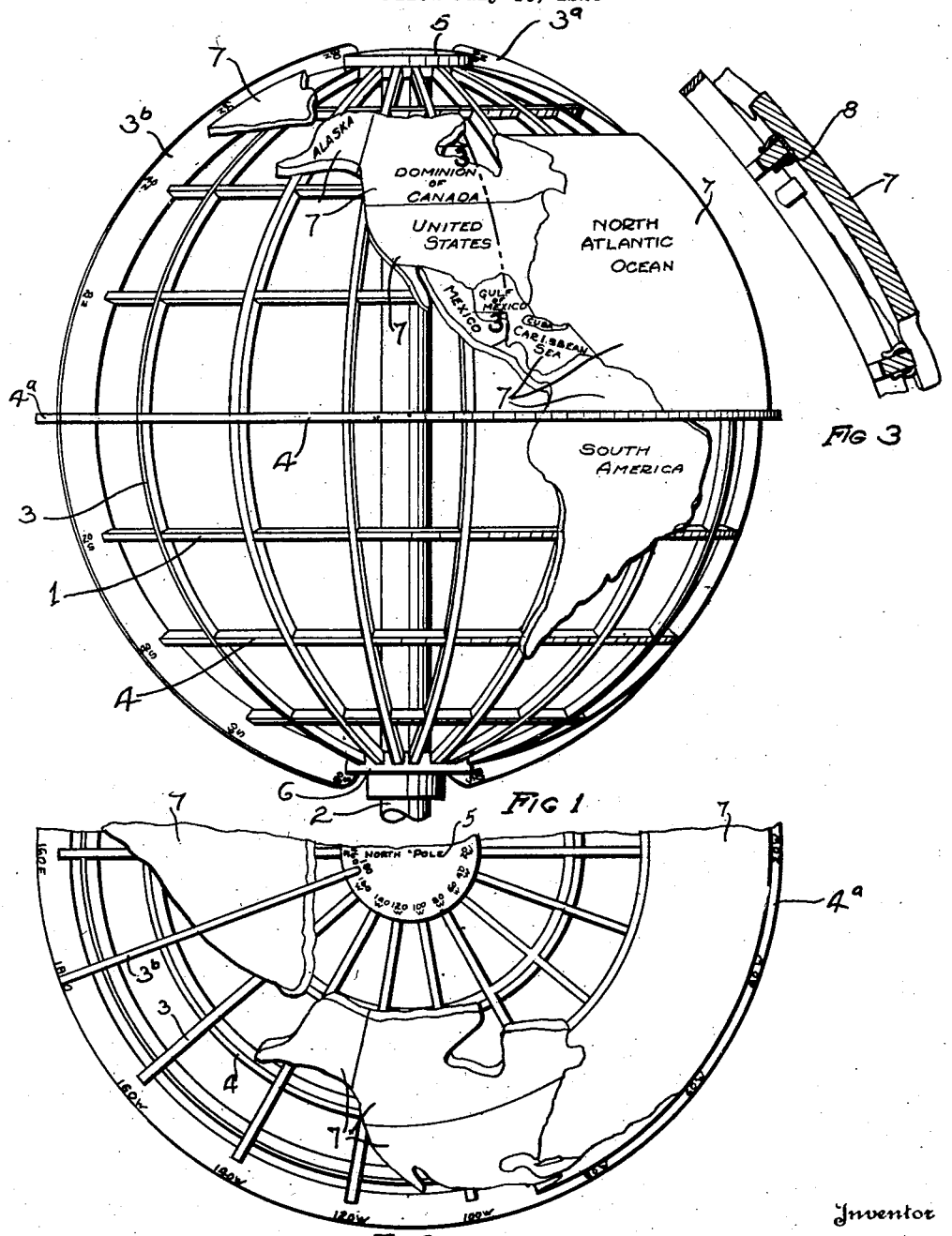

1,629,582

UNITED STATES PATENT OFFICE.

GEORGE C. McCLINTOCK, OF SAN DIEGO, CALIFORNIA.

SECTIONAL-MAP APPARATUS.

Application filed July 30, 1925. Serial No. 47,064.

My invention relates to a sectional map apparatus, more particularly to a map apparatus of this class in the form of a sphere or globe of the world.

The objects of my invention are: First, to provide a map apparatus of this class for educational purposes whereby the study of geography is made more interesting and may be taught or practiced in the form of a competitive game; second, to provide a globe of this class whereby the student may be more easily taught geographic locations relative to the longitude and latitude of the globe; third, to provide a globular frame at the outer side of which is adapted to be variously positioned and supported map sections in shell form; fourth, to provide a spherically shaped skeleton frame provided with vertical and horizontal ribs adapted to represent, respectively, the meridians and lines of latitude on the so-called "map of the world"; fifth, to provide a spherically shaped skeleton frame of this class whereby shell sections, representing various geographic localities, may be secured, by a suitable securing means, to their respective positions on the skeleton frame of the globe; sixth, to provide a globe of this class, the outer shell of which may be divided or cut into as many sections as desired, depending upon the geographic details adapted to be taught, the base for the globe or shell sections, or the skeleton frame therefor, being correspondingly divided into small sections to readily support the globe or shell section of the map; seventh, to provide a map section supporting globe in which the main meridians and parallels extend beyond the normally outer surfaces of the map section, and on which are adapted to be imprinted, respectively, the degrees of latitude and longitude; eighth, to provide a supporting means having longitude and latitude designations whereby map sections may be variously positioned relatively to the longitude and latitude designations; ninth, to provide a novel educational apparatus for teaching and learning geography; tenth, to provide as a whole a novelly constructed sectional globe of the earth, and eleventh, to provide an apparatus of this class which is simple and economical of construction, durable, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a side elevational view of my sectional globe of the earth, showing certain of the map sections, adapted to be supported thereon, removed; Fig. 2 is a fragmentary top view thereof, and Fig. 3 is an enlarged sectional view thereof, taken through 3—3 of Fig. 1.

Like characters of reference refer to similar parts and portions throughout the several views of the drawings.

The structure illustrated in the drawings is the preferred embodiment of my invention in the form of a globe of the earth, or, as commonly referred to, the world. The base or supporting structure for supporting the various map sections consists of a skeleton framework 1 in the form of a sphere. This spherical framework may be supported in any suitable manner on an axis, such as a rod 2, as is conventionally employed in supporting globes of this class, the framework 1 being revolubly mounted on the axis rod 2. The spherically shaped framework consists of a plurality of vertical circular ribs 3 and a plurality of lateral, cross-connecting or horizontal ribs 4. The vertical, circular ribs 3 are secured at their upper and lower ends, respectively, to the peripheral portions of the pole members 5 and 6 mounted on the axis rod 2, the pole members 5 and 6 representing, respectively, the Arctic and Antarctic polar regions of the globe. The vertical circular ribs 3 represent the meridians or lines of longitude on the globe, while the horizontal circular ribs 4 represent the lines of latitude, and are both correspondingly spaced.

The outer shell of the sphere or globe is made in small sections, representing various geographical localities, such as the various countries, States, continents, islands, oceans, seas, and the like. These map sections, indicated by 7, are molded or pressed in the form of sections of a sphere, either plain, with map sections printed or otherwise inscribed thereon, or in relief. The various sections are cut at their respective boundaries and are adapted to match with other sections representing the adjacent land or water. These sections 7, as illustrated in the drawings, are provided at their back sides with clips 8 which are adapted to be frictionally secured over either the vertical or horizontal circular ribs, as shown best in Fig. 3, the clips 8 being preferably made of a resilient metal. The outer surfaces of the pole members 5 and 6 extend upwardly or beyond the outer surfaces of the ribs a distance substantially equal to the thickness of the various map sections 7, as shown best in Fig. 1.

The middle horizontal rib 4, representing the equator, and indicated by 4ª, as well as the vertical circular ribs 3ª and 3ᵇ, representing, respectively, the zero and the one hundred eightieth meridians, extend outwardly a greater distance than the other parallels and meridians, and also extend outwardly beyond the normally outer surfaces of the map sections 7, as shown. On the portions of the ribs 4ª, 3ª and 3ᵇ, extending beyond the normally outer surfaces of the map sections 7, are inscribed in any convenient manner the degrees of longitude and the degrees of latitude represented by the various ribs 3 and 4.

Although the vertical ribs, representing the meridians, and the horizontal or parallel ribs, representing the lines of latitude, are shown as spaced at intervals of twenty degrees, the numbers of these ribs may be larger or smaller as desired.

On the pole members 5 and 6 are also inscribed the degrees of longitude represented by the several vertical ribs.

Though I have shown and described a particular construction, combination and arrangement of parts and portions and a particular embodiment of my invention in a globe, and particular means for securing the map sections to a supporting means or framework, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In an apparatus of the class described, a spherical supporting means provided with substantially vertical and horizontal ribs corresponding with the meridians and parallels of a map of the world, and map sections formed as sections of a sphere adapted to be supported at the outer portions of said ribs.

2. In an apparatus of the class described, a spherical supporting means provided with substantially vertical and horizontal ribs corresponding with the meridians and parallels of a map of the world, map sections formed as sections of a sphere adapted to be supported at the outer portions of said ribs, and means for removably securing said map sections to said ribs.

3. In a means of the class described, a spherically shaped skeleton frame formed of connected ribs representing and corresponding with meridians and parallels of a map of the world, and map sections formed as the sections of a spherical shell and provided at their outer surfaces with designations corresponding with surfaces of the world map, said map sections being adapted to be variously supported on said ribs.

4. In a means of the class described, a spherically shaped skeleton frame formed of connected ribs representing and corresponding with meridians and parallels of a map of the world, map sections formed as the sections of a spherical shell and provided at their outer surfaces with designations corresponding with surfaces of the world map, and resilient clips secured at the under sides of said map sections for removably securing the same to the ribs of said skeleton frame.

5. In a means of the class described, pole members mounted in axial alinement with each other, circular ribs connecting said pole members and representing and corresponding with the meridians of a map of the world, and other circular ribs transversely connecting said other ribs and representing and corresponding with the parallels of the map of the world.

6. In a means of the class described, pole members mounted in axial alinement with each other, circular ribs connecting said pole members and representing and corresponding with the meridians of a map of the world, other circular ribs transversely connecting said other ribs and representing and corresponding with the parallels of the map of the world, and map sections adapted to be removably supported in various positions relatively to said ribs.

7. In a means of the class described, pole members mounted in axial alinement with each other, circular ribs connecting said pole members and representing and corresponding with the meridians of a map of the world, other circular ribs transversely connecting said other ribs and representing and corresponding with the parallels of the map of the world, thin map sections formed as sections of the shell of a sphere adapted to be variously positioned at the outer portions of said ribs, and means for removably securing said map sections to said ribs.

8. In a means of the class described, pole members mounted in axial alinement with each other, circular ribs connecting said pole members and representing and corresponding with the meridians of a map of the world, and other circular ribs transversely connecting said other ribs and representing and corresponding with the parallels of the map of the world, the intermediate rib transversely connecting the ribs representing and corresponding with the meridians and also the ribs corresponding with the zero and one hundred eightieth meridians extending outwardly beyond the surface normally circumscribed by the outer portions of the remaining ribs.

9. In a means of the class described, pole members mounted in axial alinement with each other, circular ribs connecting said pole members and representing and corresponding with the meridians of a map of the world, other circular ribs transversely connecting said other ribs and representing and corresponding with the parallels of the map of the world, the intermediate rib transversely connecting the ribs representing and corresponding with the meridians and also the ribs corresponding with the zero and one hundred eightieth meridians extending outwardly beyond the surface normally circumscribed by the outer portions of the remaining ribs, and thin map sections formed as sections of the shell of a sphere adapted to be variously supported at the outer portions of said remaining ribs and within the normally outer portions of the outwardly extending ribs.

10. In an apparatus of the class described, a supporting means provided with ribs extending in one general direction thereon and with other ribs extending transversely with the former, said ribs representing respectively parallels of latitude and lines of longitude, and a plurality of map sections adapted to be variously and readily removably secured to said ribs.

11. In an apparatus of the class described, a support provided with securing means extending in one general direction thereon and with other securing means extending transversely with the former, said means representing respectively parallels of latitude and lines of longitude, and a plurality of map sections adapted to be variously and readily removably secured to said means.

In testimony whereof, I have hereunto set my hand at San Diego, California, this 30th day of June, 1925.

GEORGE C. McCLINTOCK.